(12) United States Patent
Shotey et al.

(10) Patent No.: US 8,101,861 B1
(45) Date of Patent: *Jan. 24, 2012

(54) ELECTRICAL DEVICE COVER

(75) Inventors: Marcus J. Shotey, Scottsdale, AZ (US);
Jeffrey P. Baldwin, Phoenix, AZ (US);
Richard Cleghorn, Tempe, AZ (US);
Kenneth C. Booth, Mesa, AZ (US)

(73) Assignee: TayMac Corporation, Gilbert, AZ (US)

( * ) Notice: Subject to any disclaimer, the term of this patent is extended or adjusted under 35 U.S.C. 154(b) by 273 days.

This patent is subject to a terminal disclaimer.

(21) Appl. No.: 12/620,481

(22) Filed: Nov. 17, 2009

Related U.S. Application Data

(63) Continuation-in-part of application No. 11/780,839, filed on Jul. 20, 2007, now Pat. No. 7,619,163, which is a continuation-in-part of application No. 11/557,580, filed on Nov. 8, 2006, now Pat. No. 7,381,894, and a continuation-in-part of application No. 11/422,583, filed on Jun. 6, 2006, now Pat. No. 7,396,996.

(60) Provisional application No. 61/252,845, filed on Oct. 19, 2009, provisional application No. 60/825,254, filed on Sep. 11, 2006, provisional application No. 60/734,858, filed on Nov. 8, 2005.

(51) Int. Cl.
*H02G 3/14* (2006.01)
(52) U.S. Cl. .............. 174/67; 174/66; 33/528; 220/241
(58) Field of Classification Search .................. 174/66, 174/67; 220/241.242; 439/553, 538; 33/528; D8/353; D13/177

See application file for complete search history.

(56) References Cited

U.S. PATENT DOCUMENTS

| | | | |
|---|---|---|---|
| 2,458,153 A | 1/1949 | Festge | |
| 2,916,733 A | 12/1959 | Hirsch | |
| 3,449,706 A | 6/1969 | Carissimi | |
| 4,634,015 A | 1/1987 | Taylor | |
| 4,803,307 A | 2/1989 | Shotey | |
| 4,988,832 A | 1/1991 | Shotey | |
| 5,042,673 A | 8/1991 | McShane | |
| 5,527,993 A | 6/1996 | Shotey et al. | |
| 5,763,831 A | 6/1998 | Shotey et al. | |
| 6,133,531 A | 10/2000 | Hayduke et al. | |
| 6,441,307 B1 | 8/2002 | Shotey et al. | |
| 6,476,321 B1 | 11/2002 | Shotey et al. | |
| 6,723,922 B1 | 4/2004 | Shotey et al. | |
| 6,761,582 B1 | 7/2004 | Shotey et al. | |
| 6,770,816 B2 | 8/2004 | Shotey et al. | |
| 6,894,223 B1 | 5/2005 | Shotey et al. | |
| 6,979,777 B2 | 12/2005 | Marcou et al. | |
| 6,987,225 B2 | 1/2006 | Shotey et al. | |
| 7,038,131 B1 | 5/2006 | Gretz | |
| 7,799,993 B2 * | 9/2010 | Drane et al. ................ 174/67 |
| 7,820,912 B1 * | 10/2010 | Shotey et al. ............... 174/67 |
| 7,880,085 B2 * | 2/2011 | Nurenberg et al. .......... 174/66 |
| 2005/0197019 A1 | 9/2005 | Shotey et al. | |

* cited by examiner

*Primary Examiner* — Dhiru R Patel
(74) *Attorney, Agent, or Firm* — Booth Udall, PLC

(57) ABSTRACT

A cover for electrical devices is disclosed. Particular implementations include an electrical device cover configured to mount over an electrical device includes a lid having a flexible membrane. The lid is coupled by a hinge to a base and the cover includes a cord port in an edge of a surface of the cover. The lid is configured to expand through the flexible membrane to an expanded position to accommodate an electrical connector coupled with the electrical device. The lid may also be configured to reduce in depth as the lid retracts from the expanded position to a refracted position through the flexible membrane.

20 Claims, 23 Drawing Sheets

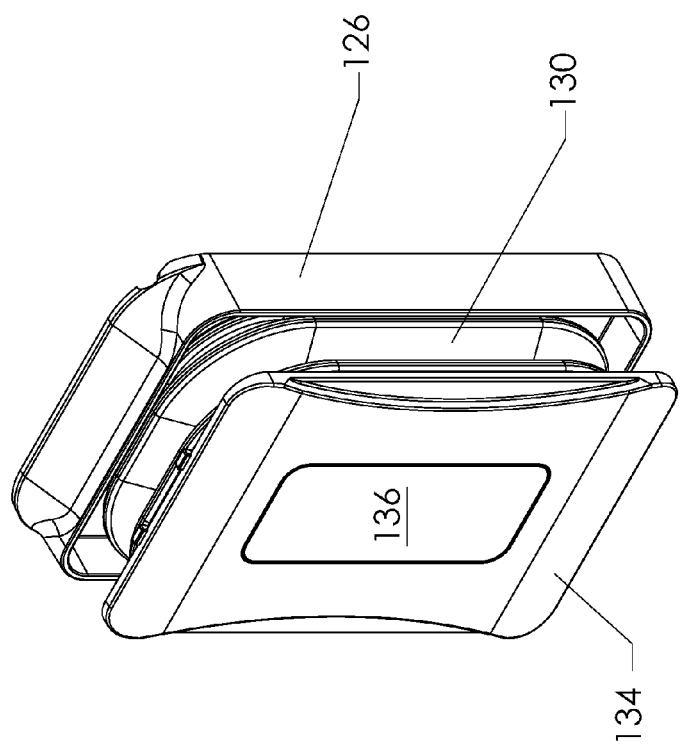

ELECTRICAL DEVICE COVER

CROSS REFERENCE TO RELATED APPLICATIONS

This document is a continuation-in-part application of the earlier U.S. Utility Patent Application to Shotey et al. entitled "Electrical Device Cover," application Ser. No. 11/780,839, filed Jul. 20, 2007, which issues as U.S. Pat. No. 7,619,163 on Nov. 17, 2009, which application is a continuation-in-part application of the earlier U.S. Utility Patent Application to Shotey et al. entitled "Electrical Device Cover," application Ser. No. 11/557,580, filed Nov. 8, 2006, which issued as U.S. Pat. No. 7,381,894 on Jun. 3, 2008, which claimed the benefit of the filing date of U.S. Provisional Patent Application 60/734,858, entitled "Flexible Outlet Cover" to Baldwin filed on Nov. 8, 2005, and the benefit of the filing date of U.S. Provisional Patent Application 60/825,254, entitled "Collapsible In-Use Cover" to Shotey et al. filed on Sep. 11, 2006 and is also a continuation-in-part application of the earlier U.S. Utility Patent Application to Maltby et al. entitled "Expandable In-Use Outlet Cover," application Ser. No. 11/422,583, filed Jun. 6, 2006, which issued as U.S. Pat. No. 7,396,996 on Jul. 8, 2008, the disclosures of which are each hereby incorporated herein by reference.

This document claims the benefit of the filing date of U.S. Provisional Patent Application to Shotey et al. entitled "Low Profile Cover Window," application Ser. No. 61/252,845, filed on Oct. 19, 2009, the disclosure of which is hereby incorporated herein by reference.

BACKGROUND

1. Technical Field

Aspects of this document relate generally to covers for electrical devices.

2. Background Art

Electrical devices are prone to exposure to water and other contaminants when mounted in locations such as exterior walls. Many different cover designs seek to shield the devices from weather-related contaminants while electrical connectors are or are not coupled with the devices. These cover designs are generally called "while-in-use" covers. Examples of typical electrical devices include receptacles, switches, and communication ports. Typical while-in-use cover designs include a base connected to a lid by a hinge.

SUMMARY

Aspects of this invention relate to covers capable of expansion and retraction for electrical devices.

In one aspect, an electrical device cover configured for mounting over an electrical device may comprise a base comprising an opening large enough to receive the electrical device, a lid comprising a lid face, and a flexible element coupled between the lid face and the base, wherein the flexible element comprises an expanded position where a majority of the flexible element is configured to extend beyond the base and accommodate an electrical connector coupled with the electrical device with the lid is closed on the base.

In particular implementations one or more of the following may be included. The lid face in any implementation may further comprise a transparent or translucent window. The window may be flexible. The base may further comprise a base ring, the lid face hingedly coupled to the base ring and the flexible element coupled between the base and the base ring. The lid may further comprise a lid ring, the lid ring hingedly coupled to the base and the flexible element coupled between the lid face and the lid ring. A first end of the flexible element and the lid face window may both be coupled to the lid face by heat staking. The lid may further comprise a lid face ring where the lid face window is immediately adjacent the flexible element and the lid face ring is on an opposing side of the flexible element and the heat staking of the lid face and the flexible element also includes heat staking of the lid face ring. The lid may be hingedly coupled to the base by a hinge biased to a closed position. The cover may further comprise a cord port at a corner of the electrical device cover between the lid and the base.

According to another aspect, an electrical device cover configured for mounting over an electrical device may comprise: a lid comprising a substantially rigid lid face comprising a transparent or translucent window, a flexible element coupled to the lid face at a first end of the flexible element, a lid ring coupled to a second end of the flexible element, the lid ring movably coupled by a hinge to a base, and a cord port in a corner of a surface of the cover, wherein the flexible element is configured to expand to an expanded position and accommodate an electrical connector coupled with the electrical device with the lid closed over the base.

In particular implementations, one or more of the following may be included. The first end of the flexible element and the lid face window may both be coupled to the lid face by heat staking. The lid face window may be immediately adjacent the flexible element and the lid face ring may be on an opposing side of the flexible element and the heat staking of the lid face and the flexible element may also include heat staking of the lid face ring. The lid may be hingedly coupled to the base by a hinge biased to a closed position. The window may be flexible.

According to yet another aspect, an electrical device cover configured for mounting over an electrical device may comprise: a base comprising an opening large enough to receive the electrical device, a lid comprising a transparent or translucent window, a flexible element coupled to the lid and the base, and a cord port in a corner of a surface of the cover between the lid and the base, wherein the flexible element is configured to expand to an expanded position and accommodate an electrical connector coupled with the electrical device with the lid closed over the base.

Particular implementations may include one or more of the following. The lid may comprise a lid ring hingedly coupled to the base, the flexible element coupled to the lid ring and a lid face, and the expansion of the flexible element may cause the lid face to expand away from the lid ring. The lid face window may be immediately adjacent the flexible element and a lid face ring may be on an opposing side of the flexible element and the lid face window, the lid face, the flexible element and the lid face ring may be all heat staked together.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The invention will hereinafter be described in conjunction with the appended drawings, where like designations denote like elements, and:

FIG. 21 is a front perspective view of the lid with the lid window of the electrical device cover of FIG. 20;

DESCRIPTION

This disclosure, its aspects and implementations, are not limited to the specific components or assembly procedures disclosed herein. Many additional components and assembly procedures known in the art consistent with the intended electrical device cover and/or assembly procedures for an electrical device cover will become apparent for use with implementations of electrical device covers from this disclosure. Accordingly, for example, although particular bases, lids, and cord ports are disclosed, such bases, lids, cord ports and implementing components may comprise any shape, size, style, type, model, version, measurement, concentration, material, quantity, and/or the like as is known in the art for such bases, lids, cord ports and implementing components, consistent with the intended operation of an electrical device cover.

Figure 1:
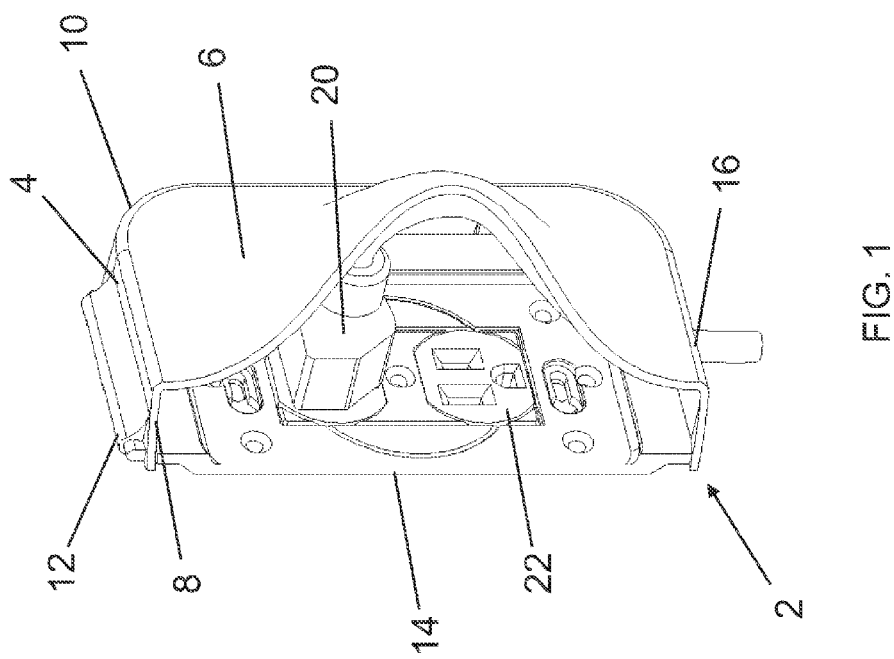
FIG. 1 is a perspective cross sectional view of an electrical device cover closed over an electrical connector in an expanded position.

FIG. 1 illustrates a sectional view of a particular implementation of an electrical device cover 2. The cover 2 may include a lid 4 which includes a lid ring 8 to which a flexible element 6 is coupled along the perimeter 10 of the lid ring 8. The lid 4 may be coupled to a base 14 through a hinge 12 and may include a cord port 16 in an edge of a surface of the cover 2. As illustrated, the cover 2 is mounted over an electrical device 22 and an electrical connector 20 is inserted into the electrical device 22. The flexible element 6 of the lid 4 illustrated in FIG. 1 is in an expanded position to accommodate the electrical connector 20 and when in the expanded position, may continuously enclose the electrical connector 20.

Figure 2:
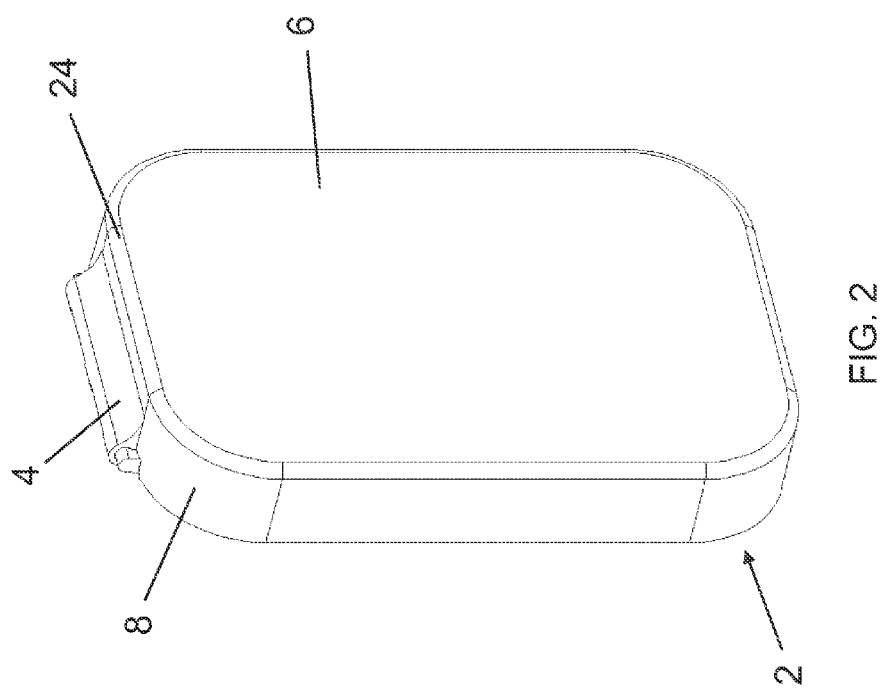
FIG. 2 is a perspective view of an electrical device cover closed over the base in a retracted position.

FIG. 2 illustrates the particular implementation of the electrical device cover 2 illustrated in FIG. 1 when the flexible element 6 is in a retracted position and the electrical connector 20 has been removed from the electrical device 22. In the implementation illustrated in FIG. 2, the lid ring 8 may include a top edge 24. When the flexible element 6 is in the retracted position, a majority of the flexible element 6 may be at or below a plane substantially parallel with the top edge 24. The ability of the lid 4 to expand and retract permits the electrical device cover 2 to increase or decrease in depth when the cover is in-use and not in use, respectively. This capability of the electrical device cover 2 allows it to operate as both a low profile cover (a cover of limited thickness) and a while-in-use cover. In the particular implementation illustrated in FIGS. 1 and 2, the cover, when in the low profile configuration, may range in depth from about 0.8 inches to about 1.75 inches. In other particular implementations of electrical device covers operating as low profile covers, the cover may be able to retract to a position about one-eighth to about three-quarters of its original depth when the cover is in the expanded position.

Figure 3:
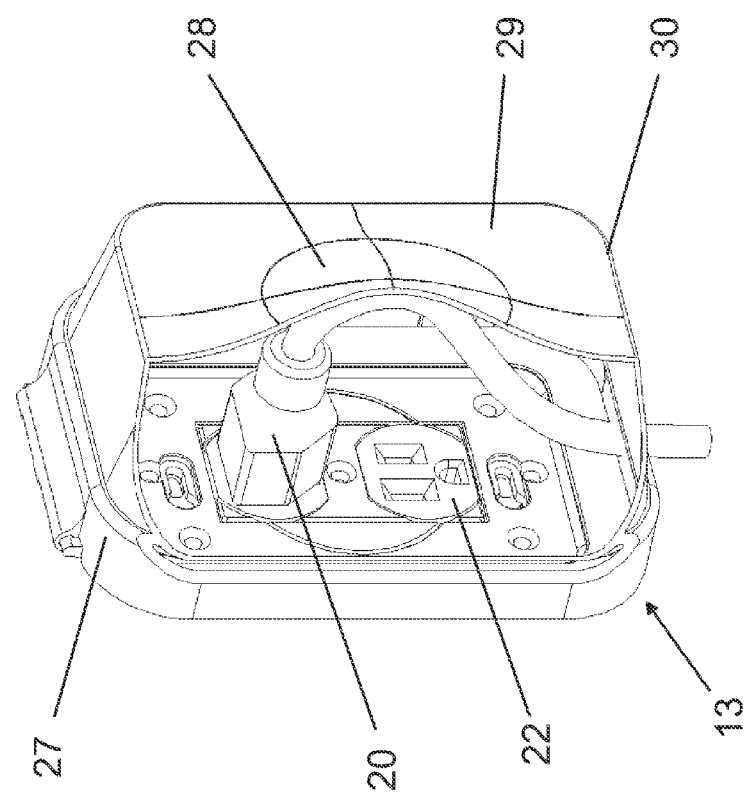
FIG. 3 is a cross section view of an electrical device cover in an expanded position.

In FIG. 3, a particular implementation of an electrical device cover 13 is illustrated where the lid 27 has a flexible element 28 and a front face 29. The front face 29 may also include a hard element 30 designed to resist expansion of the lid 27 when an electrical connector 20 is inserted into the electrical device 22 and the lid 27 is closed. As illustrated, the hard element 30 limits some of the expansion of the flexible element 28, but still allows the lid 27 to accommodate the electrical connector 20 when closed.

Figure 4:
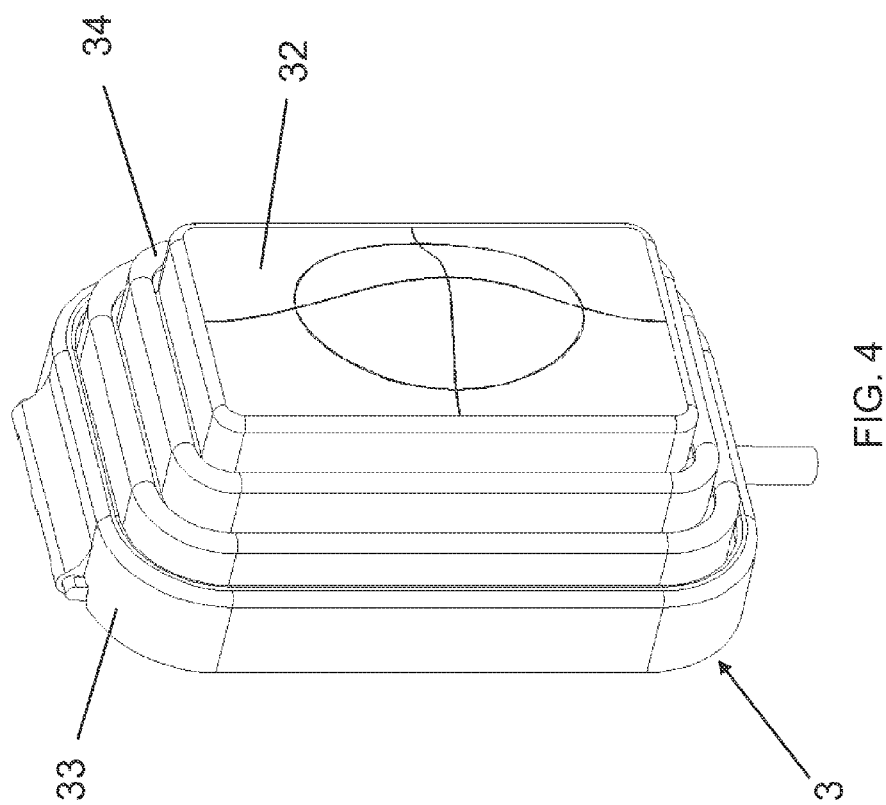
FIG. 4 is a perspective view of an electrical device cover including pleats in an expanded position.
Figure 5:
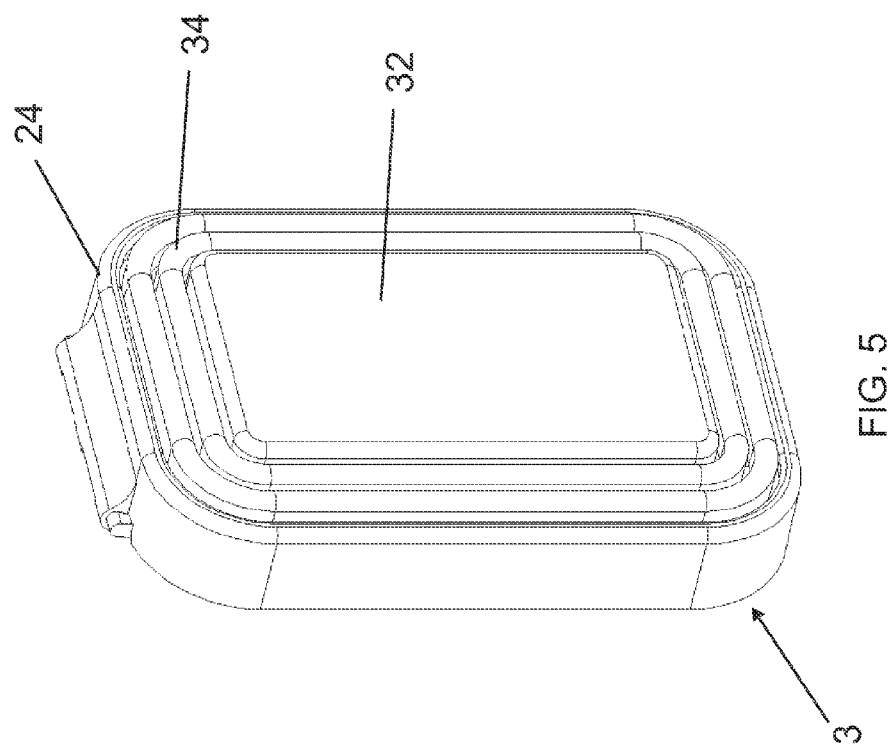
FIG. 5 is a perspective view of an electrical device cover including pleats in a retracted position.

Referring to FIG. 4, another particular implementation of an electrical device cover 3 is illustrated in an expanded position. In this particular implementation, the flexible element 32 includes at least one pleat 34 to allow the expansion of the lid 33 as it is closed. FIG. 5 illustrates the electrical device cover 3 shown in FIG. 4 in the retracted position. One example of a collapsible plastic flexible element may be found in the Rubbermaid® Collaspible® food storage containers currently available on the market and described at Rubbermaid.com. Similar construction, among many other types of construction, may be used to form a flexible element as described with reference to FIG. 4 including a form of pleats that enables the structure to remain in a collapsed position on its own. Those familiar with plastics manufacture will understand how to manufacture a flexible member having pleats as described in the various configurations herein from this description and reference to the Rubbermaid® Collaspible® food storage containers.

Figure 6:
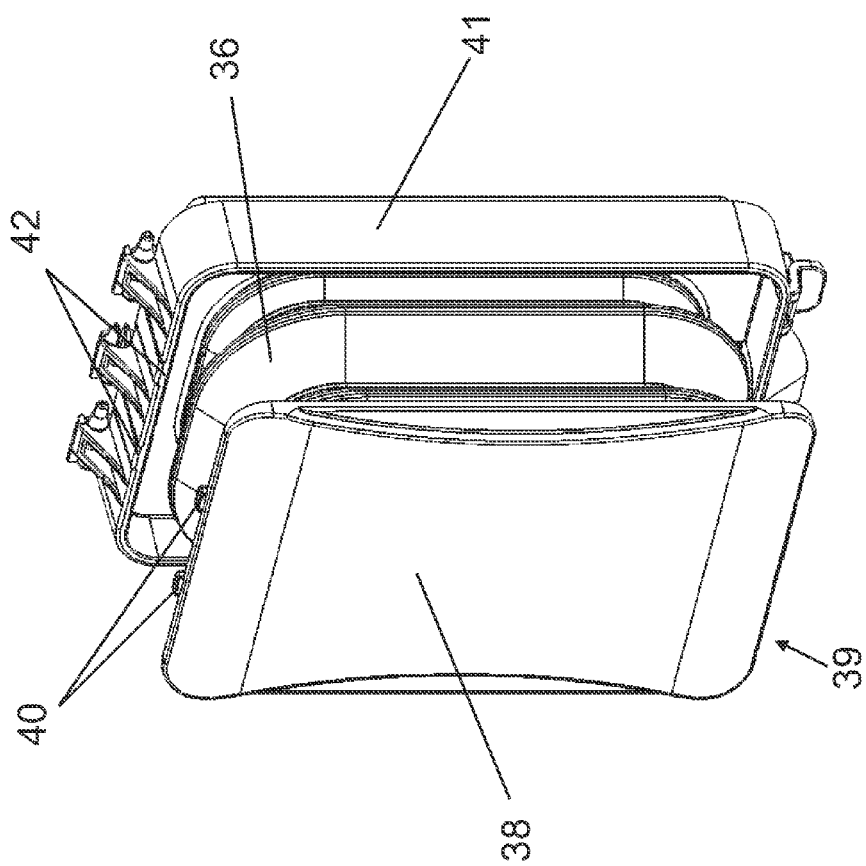
FIG. 6 is a perspective view of an electrical device cover including a hard front face in an expanded position.
Figure 7:
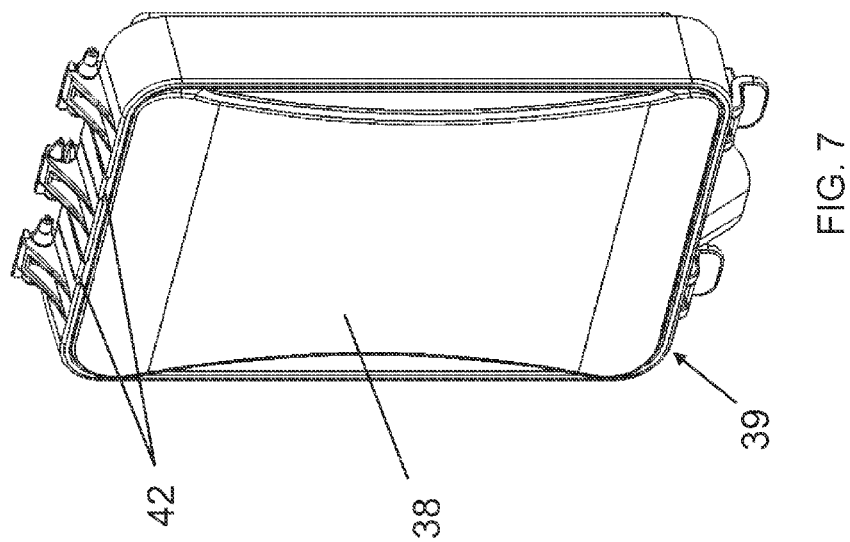
FIG. 7 is a perspective view of the electrical device cover of FIG. 6 is a retracted position.

FIG. 6 illustrates another particular implementation of an electrical device cover 39 in the expanded position. As illustrated, the flexible element 36 may be coupled with a front face 38 which may be a hard element. The front face 38 may also include a latching notch 40 along an edge configured to engage with a latching projection 42 on the lid ring 41. FIG. 7 illustrates the electrical device cover 39 in the retracted position with the latching notch 40 on the front face 38 engaged with the latching projection 42.

Figure 8:
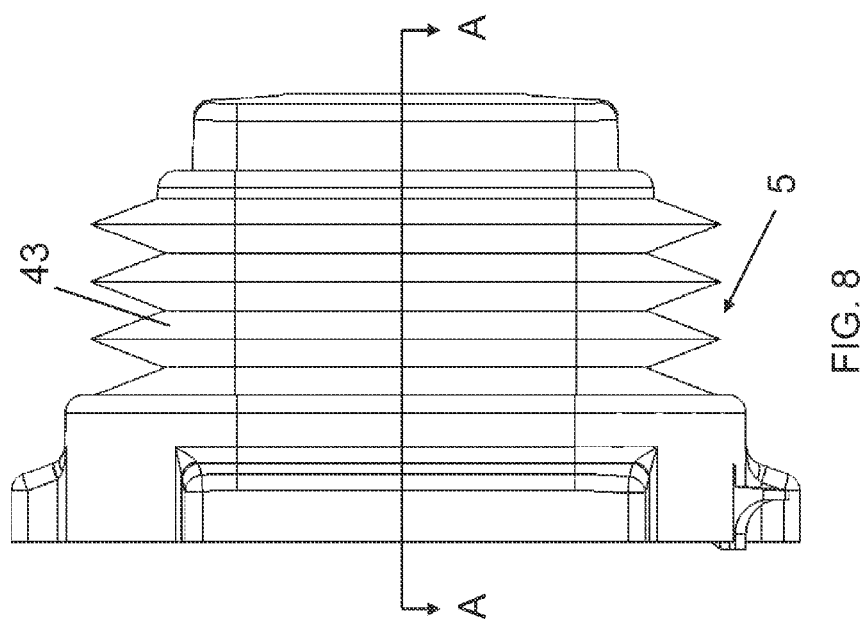
FIG. 8 is a top view of a lid of an electrical device cover showing the sectional line A.
Figure 9:
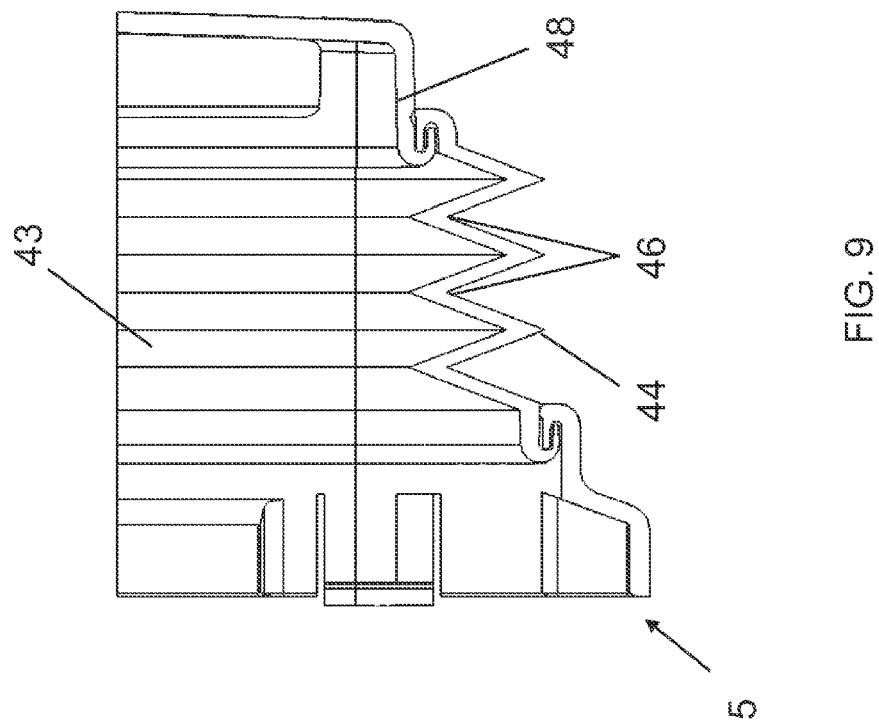
FIG. 9 is a cross sectional view of a particular implementation of a lid for an electrical device cover along the sectional line A.
Figure 10:
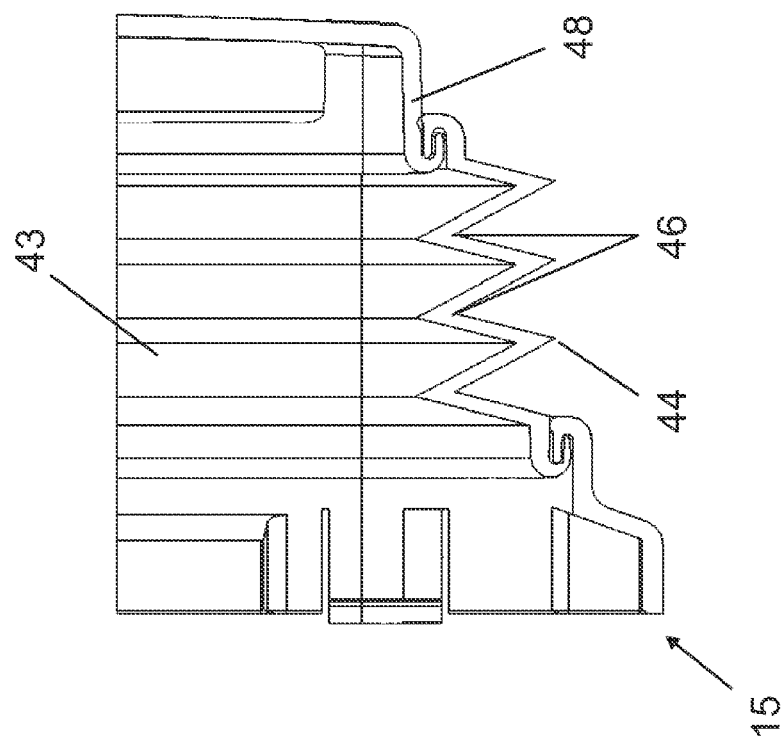
FIG. 10 is a cross sectional view of another particular implementation of a lid for an electrical device cover along the sectional line A.

Referring to FIG. 8, a top view of another particular implementation of a lid 5 is illustrated showing the sectional line A. FIG. 9 illustrates a cross section view of a particular implementation of a lid 5 along the sectional line A. As illustrated in FIGS. 8 and 9, the lid 5 includes a flexible element 43 that may include pleat structure formed by a pleat peak 44 between two peak valleys 46. In the particular implementation illustrated in FIG. 9, the pleat peak 44 is centered between the two peak valleys 46 and allows the lid face 48 to freely expand and contract between the expanded and retracted positions. FIG. 10 illustrates a cross section view similar to that of FIG. 9 taken along a similar section line of another particular implementation of a lid 15. The figure illustrates that in particular implementations, the pleat peak 44 may be aligned off-center between the pleat valleys 46 toward the lid face 48. This orientation of the pleat peak 44 may allow the lid 15 to be retained at the retracted position by forces provided through inducing the unequal curvature in the flexible element 43 on each side of the pleat peak 44 and the pleat valleys 46. To move the lid 15 to the extended position, the forces may be overcome by pulling the lid 15 outward with the lid face 48.

Figure 11:
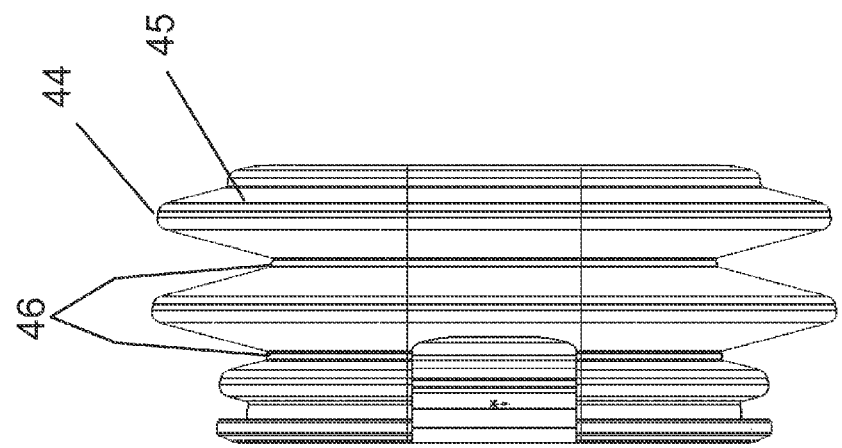
FIG. 11 is a bottom view of a portion of a lid for an electrical device cover showing the shape of the pleat peaks and pleat valleys.
Figure 12:
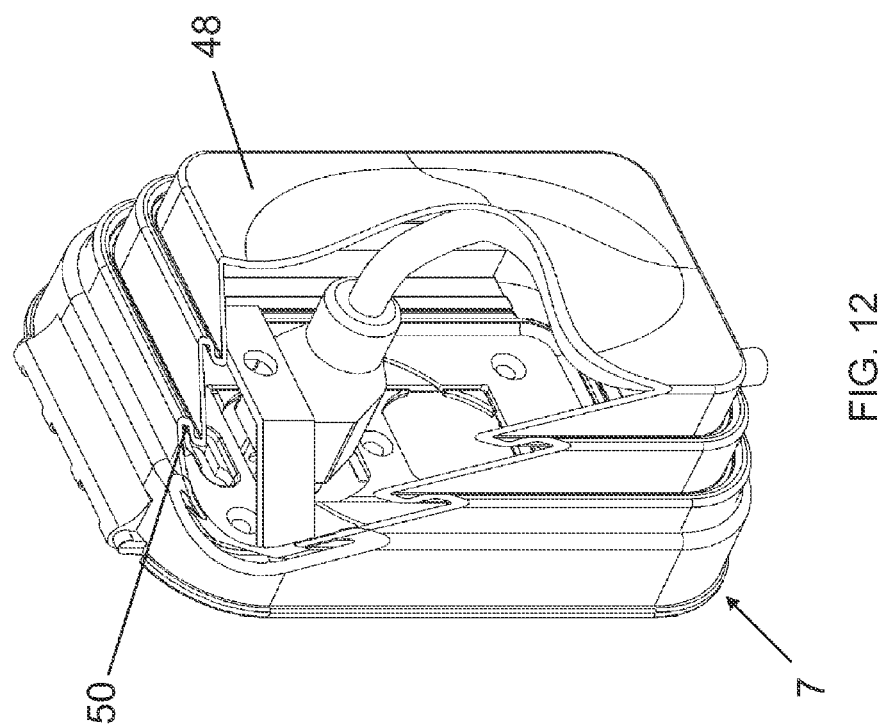
FIG. 12 is a cross section view of a particular implementation of an electrical device cover including flange shaped pleats.

Various other designs for pleat peaks 44 and pleat valleys 46 may be included in particular implementations of an electrical device cover. For example, FIG. 11 illustrates a flexible element 45 that includes a pleat peak 44 and pleat valleys 46 that are flattened rather than angled. FIG. 12 illustrates a particular implementation of an electrical device cover 7 that includes pleat peak 50 quite substantially biased toward the lid face 48, forming a pleat structure that is flange shaped. In alternate implementations, the pleat valleys may be biased toward or away the lid face. While in the implementations illustrated, the pleat structures included in the flexible element have been of a single type, particular implementations may include any type or combination of types of pleat structures.

Figure 14:
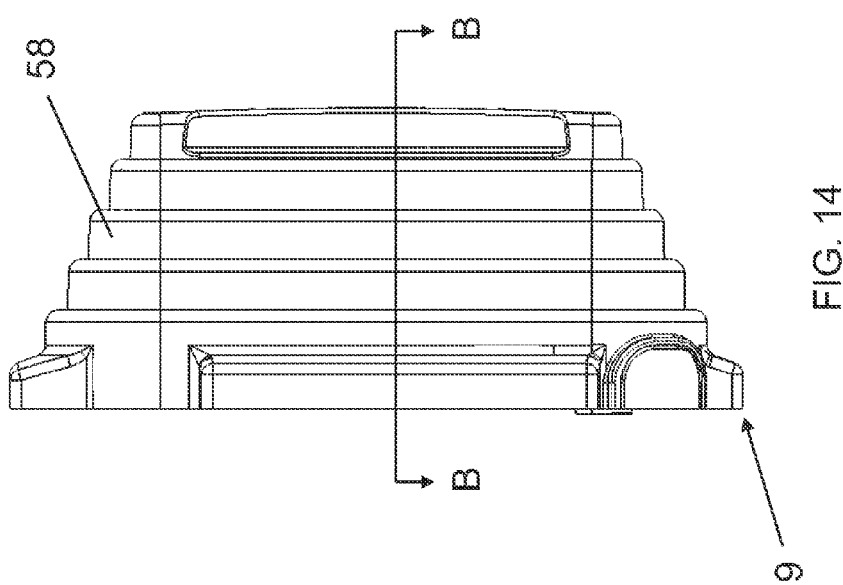
FIG. 14 is a top view of a lid for an electrical device cover showing the sectional line B.
Figure 15:
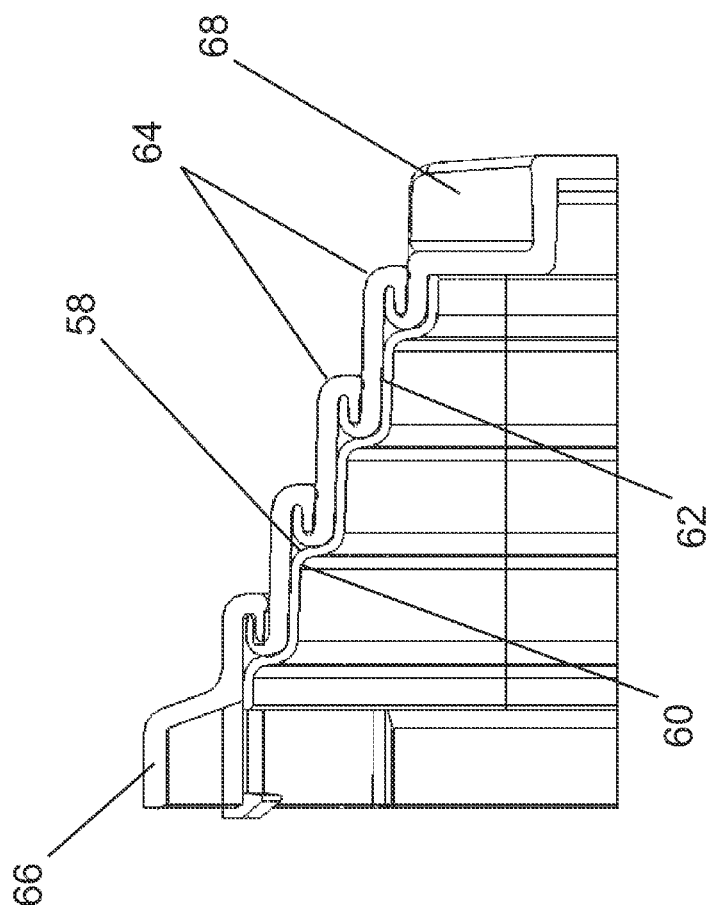
FIG. 15 is a cross section view of a lid for an electrical device cover along the sectional line B.

FIG. 14 illustrates another particular implementation of a lid 9 for an electrical device cover. FIG. 15 illustrates a cross section of the lid 9 shown in FIG. 14 along sectional line B. The flexible element 58 illustrated in FIG. 15 may include a flexible sheath 60 that runs along the inner surface 62 of a plurality of interlocking rings 64. The flexible sheath 60 may be coupled to all or a portion of the inner surface 62 of the interlocking rings 64 by adhesives, and the like, or may be free-standing. The interlocking rings 64 couple the lid face 68 with a lid ring 66. The flexible sheath 60 resists water and other contaminants from penetrating to the interior of the lid 9 through the interstices of the interlocking rings while the lid 9 is closed over an electrical connector. Like the other implementations discussed in this document, the flexible element 58 and the interlocking rings 64 permit the lid 5 to move both to an extended position and a retracted position depending on whether the a low profile or while-in-use application for the cover is desired.

Figure 16:
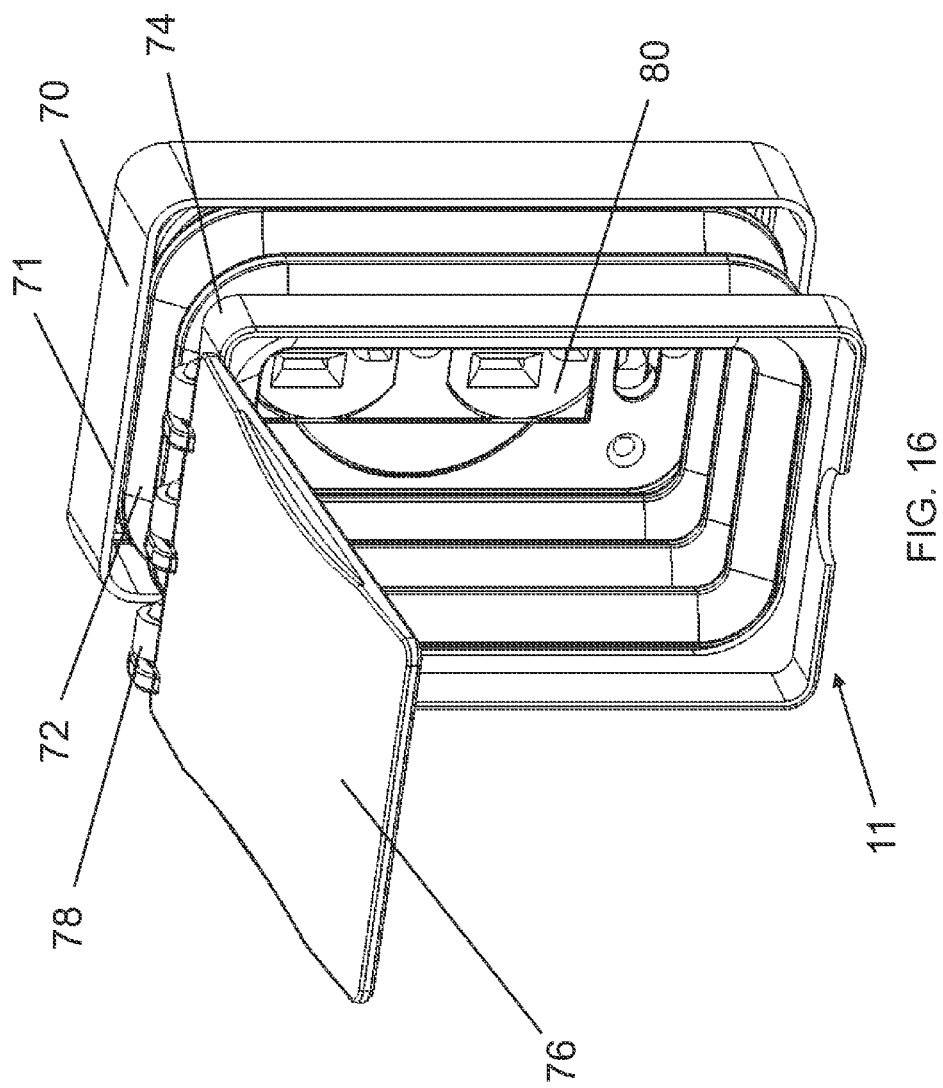
FIG. 16 is a perspective view of an electrical device cover with a base ring with the lid partially open

FIG. 16 illustrates another particular implementation of an electrical device cover 11. As illustrated, the electrical device cover 11 may include a base 70 that may have a flexible element 72 coupled to the base 70 around a majority of the base's 70 perimeter 71. A base ring 74 may be coupled to the flexible element 72, and a lid 76 may be movably coupled with the base ring 74 through a hinge 78. When the lid 76 is closed over the base 70, the flexible element 72 may be expanded to the expanded position to continuously enclose an electrical connector inserted into an electrical device 80 covered by the base 70. Similar to the other particular implementations disclosed in this document, the cover 11 can also be moved to the retracted position through the flexible element 72 coupled with the base 70.

Figure 13:
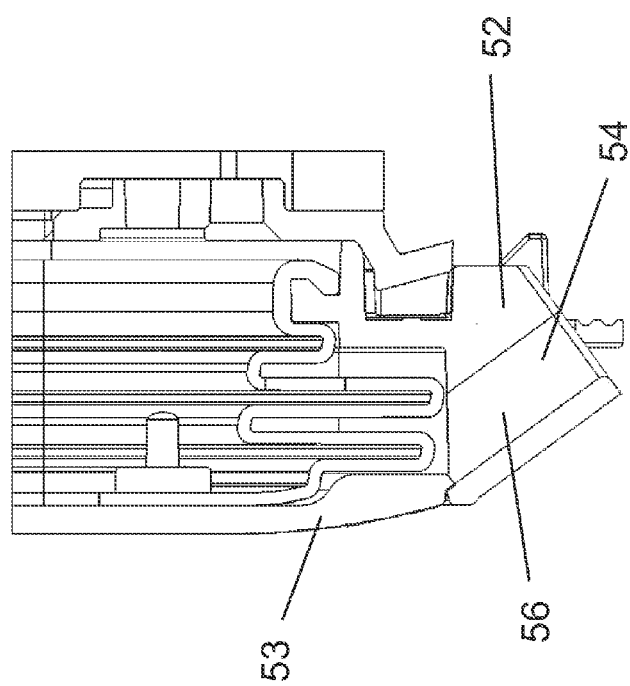
FIG. 13 is a cross section view of an electrical device cover showing a channel for a cord port angled toward the base.

The particular implementations disclosed in this document include cord ports in an edge of a surface of the electrical device cover. For example, the particular implementation shown in FIG. 1 includes a cord port 16 a surface of the lid 4. FIG. 13 illustrates a particular implementation of a cord port 54 that includes a channel 56 angled toward the base 52 of an electrical device cover similar to the implementation illustrated in FIG. 6. While the implementation shown in FIG. 13 has a channel 56 in the base 52, other particular implementations may have the channel in the lid 53 or in both the base 52 and the lid 53. Also, particular implementations of a cord port may include apertures that may be open or may be closed by a barrier intended to resist the ingress of water or other contaminants into the cover through the cord port. In addition, particular implementations of an electrical device cover may include a cord port that may be closed by a removable tab in the base 52, the lid 53, or both the base 52 and the lid 53. Removal of the removable tab by the user opens the apertures of the cord port and prepares them for use. Particular implementations of electrical device covers may also include a plurality of the cord ports described.

Particular implementations of an electrical device cover may also be configured to mount vertically or horizontally. This may involve the use of base and lid hinge members on adjacent sides such as that shown and described in U.S. Pat. No. 5,763,831 to Shotey et al., the disclosure of which is hereby incorporated herein by reference, a later version of horizontal and vertical hingeable cover known in the art, or even a corner hinge member such as that shown and described in U.S. Pat. No. 6,133,531 to Hayduke et al., the disclosure of which is hereby incorporated herein by reference. There are presently many possible hinge variations known in the art that permit horizontal and vertical mounting of electrical device covers all of which would be applicable here.

In addition, particular implementations of an electrical device cover may include a base that has at least one removable tab and may also include an adapter plate which may have one removable tab. Removal of the tabs in the base and/or the adapter plate may allow the cover to be configured for use with a first electrical device or converted to be configured for use with a different second electrical device. Relevant teachings regarding the structure and manufacture of electrical device covers with removable tabs in the base and in an adapter plate are found in U.S. Pat. No. 6,642,453 to Shotey, et al., the disclosure of which is hereby incorporated herein by reference.

Figure 17:
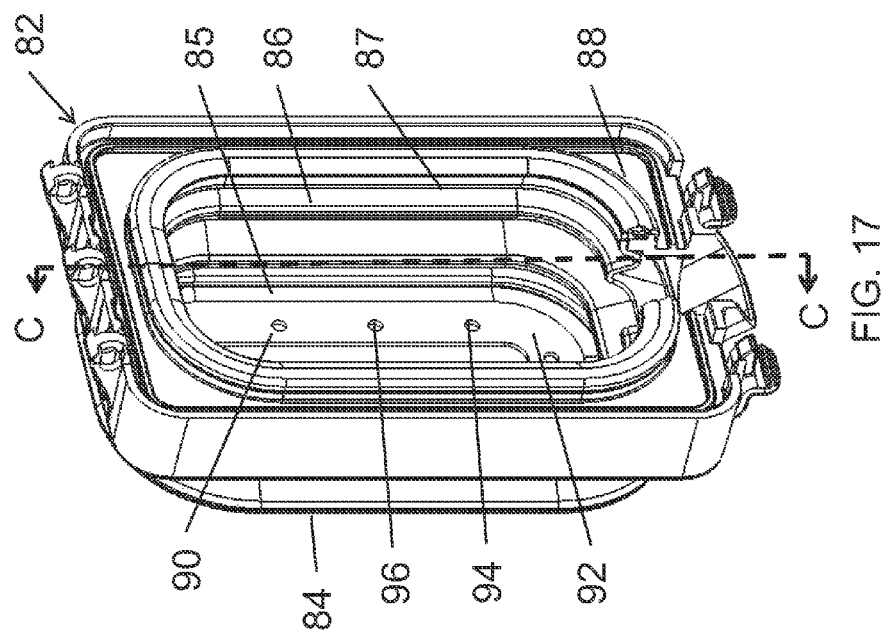
FIG. 17 is a rear perspective view of an electrical device cover with a lid ring coupled to a flexible member showing the sectional line C.

Referring to FIG. 17, a particular implementation of a lid 82 is illustrated, showing the sectional line C. As illustrated, the lid 82 may include a lid face 84 coupled to a first end 85 of the flexible element 86 and a lid ring 88 coupled to a second end 87 of the flexible element 86. The flexible element 86 may include a plurality of lid face mounting apertures 90 therethrough disposed along a perimeter of the first end 85. Implementations of a lid 82 may also include a retaining ring 92 having a plurality of retaining holes 94 corresponding to the plurality of lid face mounting apertures 90 on the perimeter of the first end 85 of the flexible element 86. A plurality of retaining projections 96 on the lid face 84 may extend through the retaining holes 94 and lid face mounting apertures 90. In particular implementations, a heat staking process may be used to melt the ends of the retaining projections 96 to prevent the removal of the retaining projections 96 through the retaining holes 94 and the lid face mounting apertures 90. In other particular implementations, no retaining ring 92 may be used, and a heat staking process may be used to couple the retaining projections 96 over the lid face mounting apertures 90 in the perimeter of the first end 85 of the flexible element 86. In other particular implementations, no retaining projections 96 or lid face mounting apertures 90 may be used; rather (or in addition to the retaining projections 96) the first end 85 of the flexible element 86 may be coupled with the lid face 84 through use of friction force, glue, adhesive, double sided tape or Velcro®.

Figure 18:
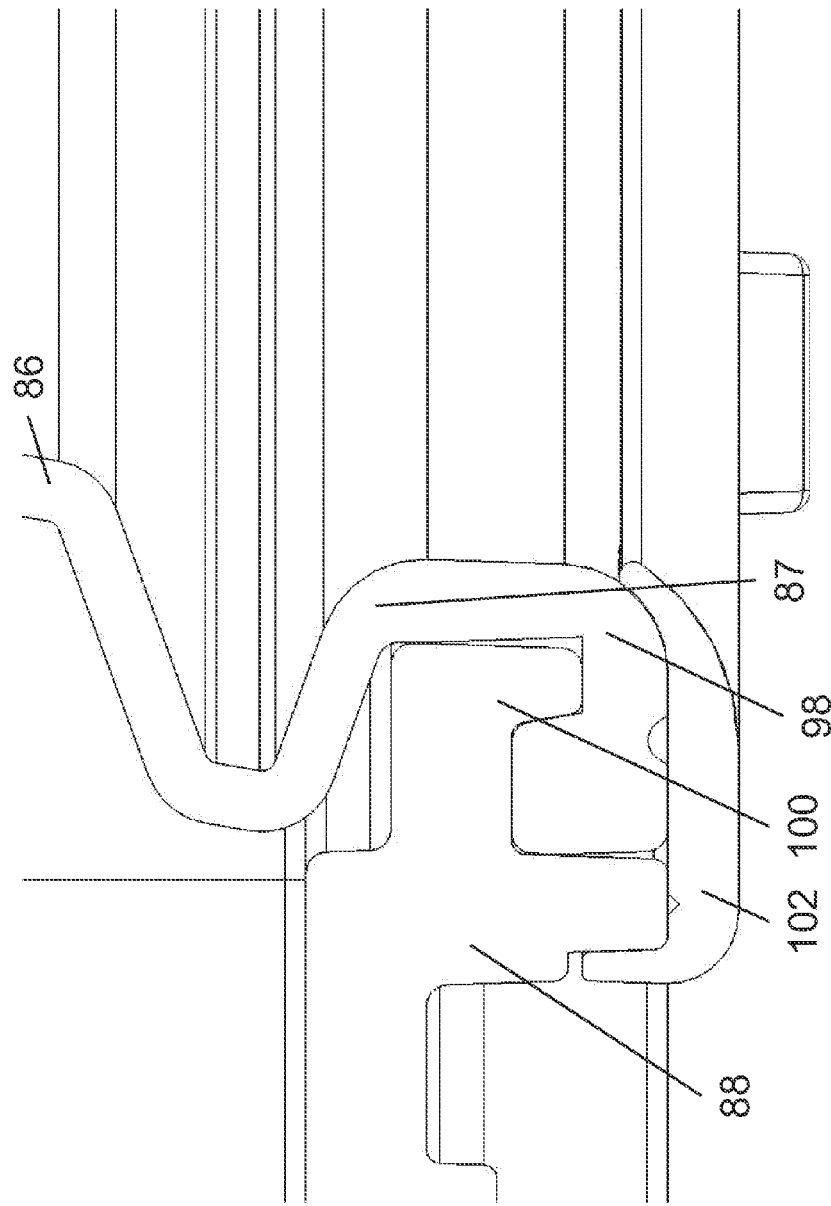
FIG. 18 is a cross section view of the intersection of a flexible member coupled to the lid ring along the sectional line C.
Figure 19:
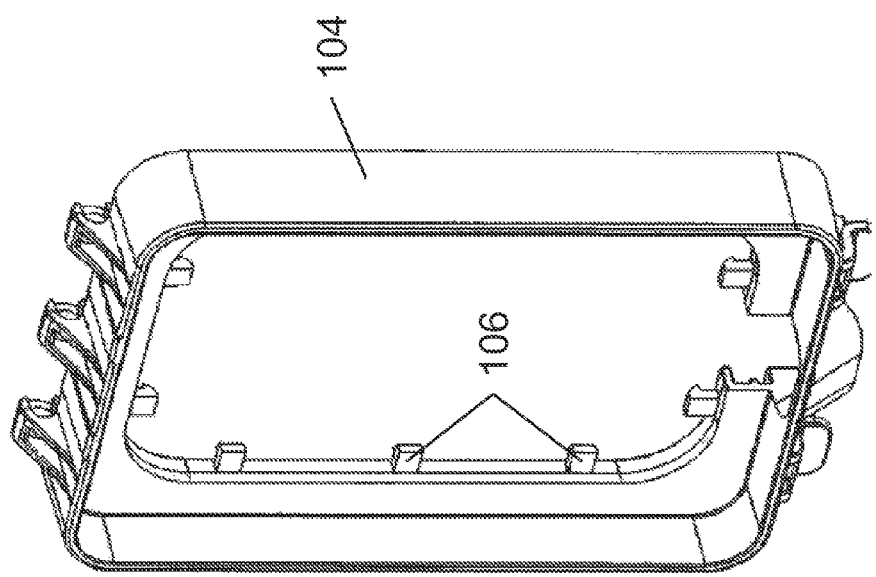
FIG. 19 is a front perspective view of a particular implementation of a lid ring.

Referring to FIGS. 18 and 19, a cross section view of the second end 87 of the flexible element 86 coupled with the lid ring 88 is illustrated. The second end 87 of the flexible element 86 may include a lid ring mounting pleat 98 extending around the majority of a perimeter of the second end 87. The lid ring mounting pleat 98 may be inserted over a plurality of mounting prongs 106 that extend inwardly from a perimeter of the lid ring 88 (see FIG. 19 for the position of the mounting prongs 106 in a particular implementation of a lid ring 104). In other particular implementations, the lid ring mounting pleat 98 may be inserted over a continuous ridge 100 that extends along a majority of the perimeter of the lid ring 88 (see FIGS. 17 and 18). The continuous ridge 100 may extend along the entire perimeter of the lid ring 88, may extend along only a portion, or may extend only in sections along the perimeter of the lid ring 88. The perimeter of the lid ring 88 referred to may be either the outer or inner perimeter of the lid ring 88. In particular implementations of a lid 82, the lid ring mounting pleat 98 may be held to the continuous ridge 100 through, by non-limiting example, friction force, glue, adhesive, double-sided tape, or Velcro®. In other particular implementations, the lid 82 may further, or alternatively, include a retainer ring 102 coupled along a majority of the perimeter of the lid ring 88 that is shaped to substantially cover the portion of the lid ring mounting pleat 98 that extends over the continuous ridge 100 (FIGS. 17 and 18) or mounting prongs 106 (FIG. 19). The retainer ring 102 may be coupled over the lid ring 88 after the lid ring mounting pleat 98 has been coupled over the continuous ridge 100 or mounting prongs 106. The retaining ring 102 may be coupled to the lid ring 88 through, by non-limiting example, glue, adhesive, heat stakes or other common techniques used to couple two parts together. In particular implementations, the retaining ring 102 may be coupled to the lid ring 88 through a sonic welding process, which allows the retaining ring 102, which may be composed of a plastic material, to be coupled to the lid ring 88, which may also be a plastic material, without being coupled to the flexible element 86 in the process, which may be formed of a rubber material.

Figure 20:
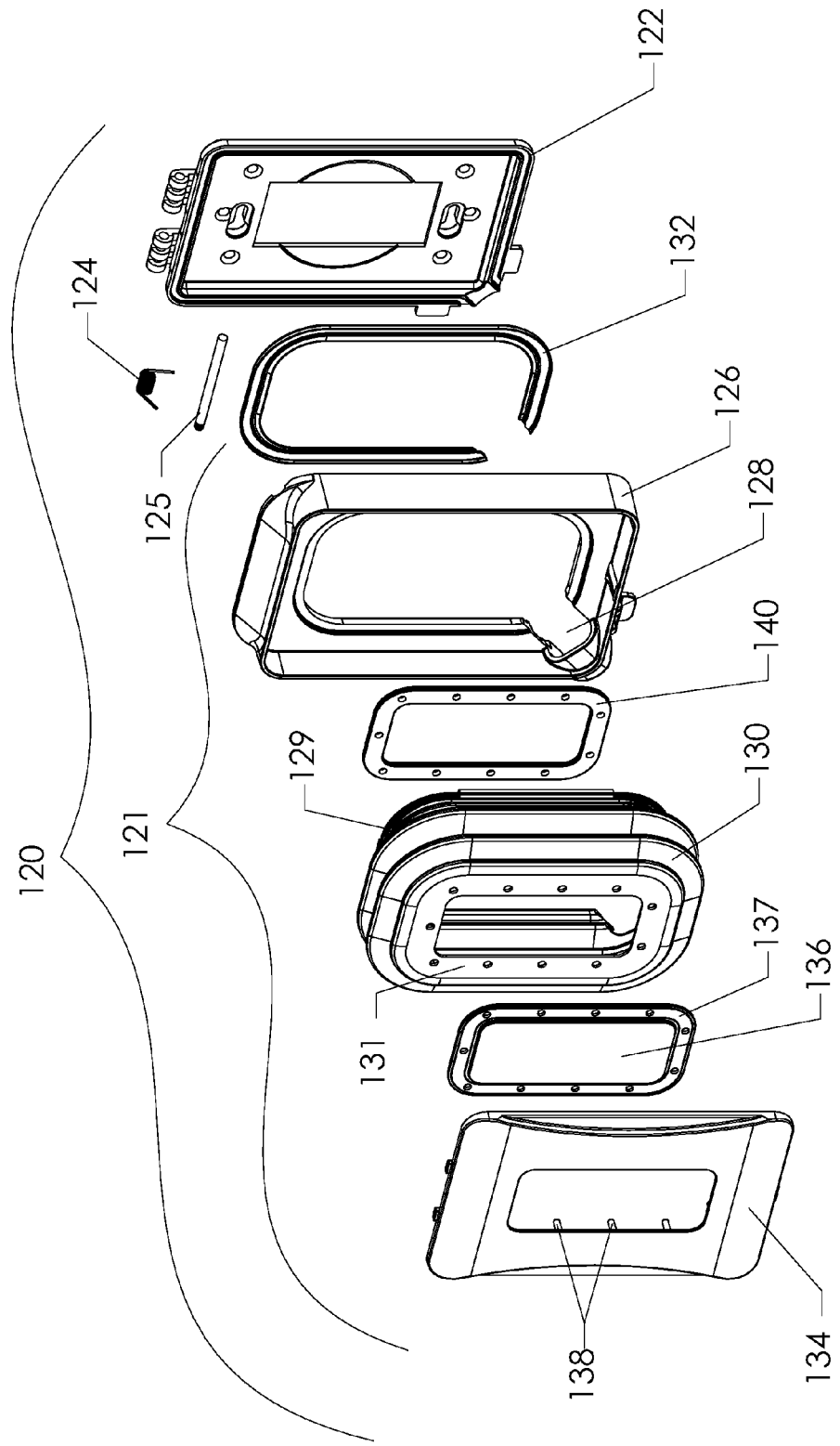
FIG. 20 is a blown-apart perspective view of a particular implementation of an electrical device cover.
Figure 23:
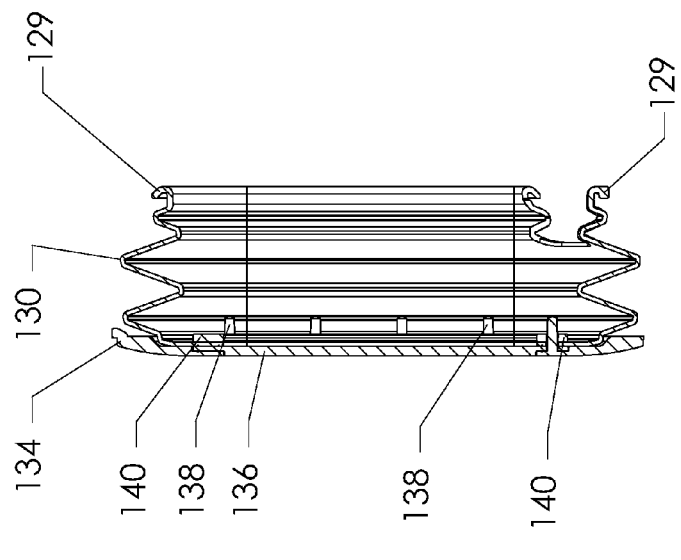
FIG. 23 is a cross-sectional view of the lid of FIG. 21 taken along section line A-A of FIG. 22.
Figure 22:
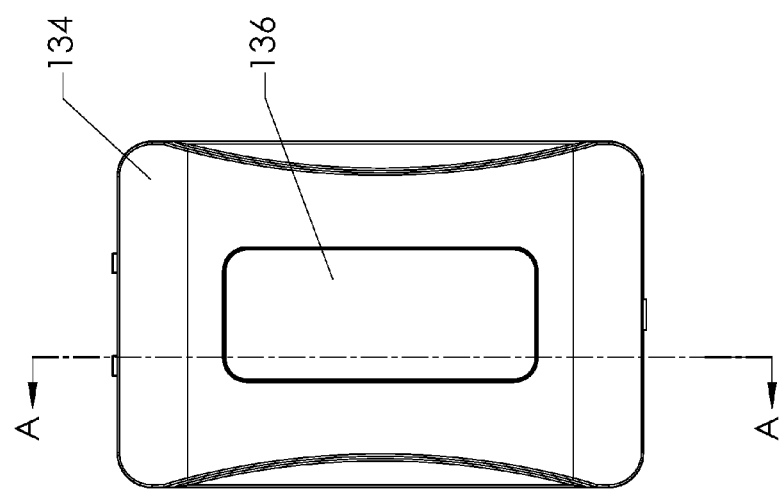
FIG. 22 is a front view of the lid of FIG. 21.

Referring to FIGS. 20-25, another particular implementation of an electrical outlet cover 120 is illustrated. FIG. 20 illustrates all of the components separated to show them more clearly, and FIGS. 21-25 illustrate the lid 121 components assembled to show how they work together. The electrical outlet cover 120 comprises a base 122 comprising a biasing spring 124 and hinge pin 125 which operatively engage with the lid ring 126 to form a self-closing cover 120 that is biased into the closed position whether mounted horizontally or vertically and includes a corner cord port 128. The cover 120 further comprises a flexible element 130, that couples to the lid ring 126 at a second end 129 as illustrated in FIGS. 17 and 18, through a retaining ring 132 sonically welded to the lid ring 126. The lid face 134 of this particular implementation comprises a lid face window 136 comprising a transparent or translucent plastic material in its center and is coupled to the lid face 134.

Figure 24:
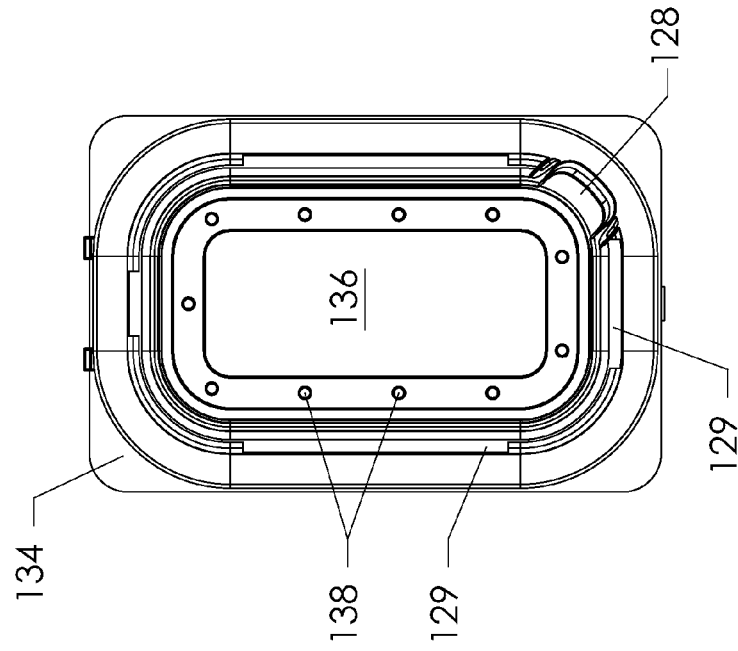
FIG. 24 is a rear view of the lid of FIG. 21.
Figure 25:
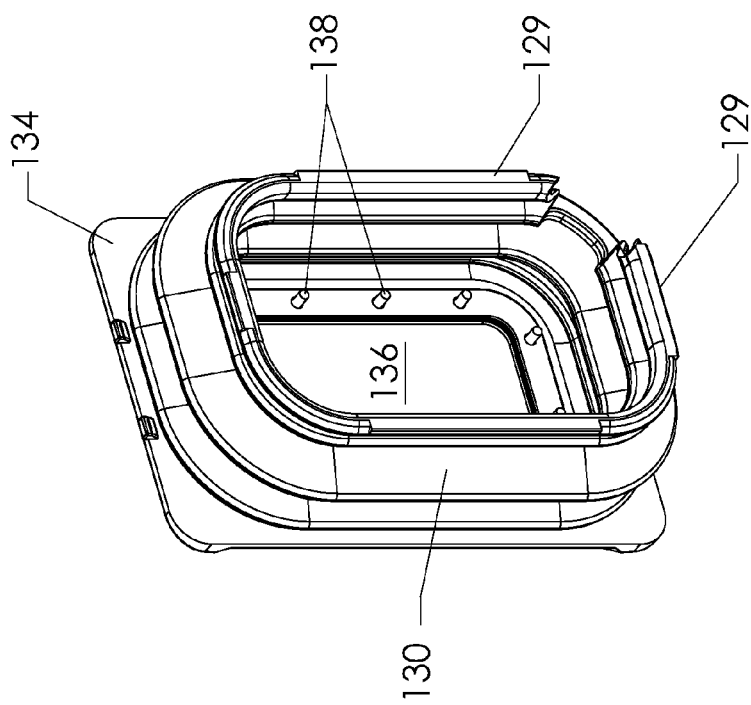
FIG. 25 is a rear perspective view of the lid of FIG. 21.

Although this particular implementation illustrates the lid face window 136 coupled through heat stakes 138 extending through the periphery 137 of the lid face window 136, through a first end 131 of the flexible element 130 that couples the lid face 134 to the lid ring 126, and through a lid face retaining ring 140, the lid face window 136 may be coupled to the lid face 134 in any other way known in the art including simply by sonic or heat welding, friction force (compression), adhesive, or any other method known in the art or described herein. Although the illustrations of FIGS. 20-25 illustrate the heat stakes 138 prior to being "heat staked," it will be understood by those of ordinary skill in the art that during the assembly process, when assembled as shown in FIGS. 24 and 25, the heat stakes 138 are each squashed with a heated prod that causes the end of the heat stakes 138 to mushroom over the opening and securely fasten the lid face retaining ring 140 to the lid face and hold each of the flexible element 130 and window that are between them. Thus, the flexible element 130 is coupled between the lid face 134 and the base 122, through the lid ring 126, and allows the lid to close on the base 122 while an electrical plug is plugged into the electrical outlet.

The benefit of the lid face window 136 in the lid face 134 is not only attained through how it is coupled to the lid face, but in the existence of the lid face window 136 in the expandable lid face 134. Through the use of a lid face 134, a user approaching the outlet can know without opening the cover 120 what type of electrical outlet or switch or other device is mounted within the electrical box with which the cover 120 is associated, what the status of the outlet (e.g. if it is a ground fault current interruption outlet if it has been tripped) or switch (on or off or some other position) or other device is in, and if it is an outlet what electrical device, if any, is plugged into the outlet. Although the particular implementations of FIGS. 20-25 show an opaque or non-see-through lid face 134 surrounding a transparent or translucent lid face window 136, it should be understood that the lid face window 136 may fill the entire space of the lid face 134 such that the lid face 134 is entirely made of transparent or translucent material and is itself the lid face window 136. Expanding and collapsing of the lid 121 is accomplished the same as with the implementation shown in FIGS. 6 and 7, and 17 and 18.

The use of a lid face window 136 may be used in any of the other particular implementations shown and described throughout this disclosure as well. Particularly, the implementations shown with soft or malleable lid faces may be formed with a transparent or translucent flexible or hard material in place of all or a portion of the front surface. The implementations shown with a hard lid face may be formed with a transparent or translucent flexible or hard material in place of all or a portion of the lid face. The particular size and/or shape of the lid face window is not crucial to the operation either, so long as an observer can see to some degree through the lid face to something within the cover. For the specific implementation of FIG. 16, inclusion of a lid face window 136 (FIG. 21) within the lid face 76 of that implementation may be accomplished using adhesive around the edge of the lid face or heat stakes as with the particular implementation shown in FIG. 21. This would result in a flexible element 72 coupled between the base 70 and the lid face 76 to allow the lid to be closed when an electrical plug is plugged into the electrical outlet 80.

The components included in a particular implementation of an electrical device cover may be formed of any of many different types of materials or combinations that can readily be formed into shaped objects and that are consistent with the intended operation of an electrical device cover. For example, the components may be formed of: rubbers (synthetic and/or natural) and/or other like materials; polymers and/or other like materials; plastics, and/or other like materials; composites and/or other like materials; metals and/or other like materials; alloys and/or other like materials; and/or any combination of the foregoing.

Furthermore, the base, lid, flexible element and any other components forming a particular implementation of an electrical device cover may be manufactured separately and then assembled together, or any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled or removably coupled with one another in any manner, such as with adhesive, a weld, a fastener, any combination thereof, and/or the like for example, depending on, among other considerations, the particular material(s) forming the components. For the exemplary purposes of this disclosure, the lid face may be formed of a PVC material and coupled to the first end of the flexible element through a heat staking process. The flexible element may be formed of a rubber material and may be coupled to the lid ring that may be formed of a PVC material through a retainer ring that may be formed of a PVC material by sonic welding of the retaining ring to the lid ring.

It will be understood that implementations are not limited to the specific components disclosed herein, as virtually any components consistent with the intended operation of a method and/or system implementation for an electrical device cover may be utilized. Accordingly, for example, although particular bases, lids, and cord ports may be disclosed, such components may comprise any shape, size, style, type, model, version, class, grade, measurement, concentration, material, weight, quantity, and/or the like consistent with the intended operation of a method and/or system implementation for an electrical device cover may be used.

In places where the description above refers to particular implementations of an electrical device cover, it should be readily apparent that a number of modifications may be made without departing from the spirit thereof and that these implementations may be applied to other electrical device covers. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

The invention claimed is:

1. An electrical device cover configured for mounting over an electrical device, the electrical device cover comprising: a base comprising an opening large enough to receive the electrical device; a lid comprising a lid face; and a flexible element coupled between the lid face and the base; wherein the flexible element comprises an expanded position where a majority of the flexible element is configured to extend beyond the base and accommodate an electrical connector coupled with the electrical device with the lid is closed on the base, and a retracted position where at least a majority of the flexible element is configured to reside within the base.

2. The electrical device cover of claim 1, the lid face further comprising a transparent or translucent window.

3. The electrical device cover of claim 2, wherein the window is flexible.

4. The electrical device cover of claim 1, the base further comprising a base ring, the lid face hingedly coupled to the base ring and the flexible element coupled between the base and the base ring.

5. The electrical device cover of claim 4, the lid face further comprising a transparent or translucent window therein.

6. The electrical device cover of claim 1, the lid further comprising a lid ring, the lid ring hingedly coupled to the base and the flexible element coupled between the lid face and the lid ring.

7. The electrical device cover of claim 6, the lid face further comprising a transparent or translucent window therein.

8. The electrical device cover of claim 7, wherein a first end of the flexible element and the window are both coupled to the lid face by heat staking.

9. The electrical device cover of claim 8, the lid further comprising a lid ring, wherein the window is immediately adjacent the flexible element and the lid ring is on an opposing side of the flexible element and the heat staking of the lid face and the flexible element also includes heat staking of the lid ring.

10. The electrical device cover of claim 1, wherein the lid is hingedly coupled to the base by a hinge biased to a closed position.

11. The electrical device cover of claim 10, further comprising a cord port at a corner of the electrical device cover between the lid and the base.

12. The electrical device cover of claim 1, further comprising a cord port at a corner of the electrical device cover between the lid and the base.

13. An electrical device cover configured for mounting over an electrical device, the electrical device cover comprising: a lid comprising a substantially rigid lid face comprising a transparent or translucent window; a flexible element coupled to the lid face at a first end of the flexible element; a lid ring coupled to a second end of the flexible element, the lid ring movably coupled by a hinge to a base; and a cord port in a corner of a surface of the cover; wherein the flexible element is configured to expand to an expanded position and accommodate an electrical connector coupled with the electrical device with the lid closed over the base, and to retract to a retracted position.

14. The electrical device cover of claim 13, wherein the first end of the flexible element and the window are both coupled to the lid face by heat staking.

15. The electrical device cover of claim 14, wherein the window is immediately adjacent the flexible element and the lid ring is on an opposing side of the flexible element and the heat staking of the lid face and the flexible element also includes heat staking of the lid.

16. The electrical device cover of claim 13, wherein the lid is hingedly coupled to the base by a hinge biased to a closed position.

17. The electrical device cover of claim 13, wherein the window is flexible.

18. An electrical device cover configured for mounting over an electrical device, the electrical device cover comprising: a base comprising an opening large enough to receive the electrical device; a lid comprising a transparent or translucent window; a flexible element coupled to the lid and the base; and a cord port in a corner of a surface of the cover between the lid and the base;

wherein the flexible element is configured to expand to an expanded position and accommodate an electrical connector coupled with the electrical device with the lid closed over the base, and to retract to a retracted position.

19. The electrical device cover of claim 18, wherein the lid comprising a lid ring hingedly coupled to the base, the flexible element coupled to the lid ring and a lid face, the expansion of the flexible element causing the lid face to expand away from the lid ring.

20. The electrical device cover of claim 19, wherein the window is immediately adjacent the flexible element and a lid ring is on an opposing side of the flexible element and the window, the lid face, the flexible element and the lid ring are all heat staked together.

* * * * *